United States Patent [19]

Nagashima et al.

[11] Patent Number: 4,517,591

[45] Date of Patent: May 14, 1985

[54] COLOR PRINTING APPARATUS

[75] Inventors: Masayoshi Nagashima, Chigasaki; Hiroshi Yamane, Ebina; Mitsuo Yamashita, Yokohama, all of Japan

[73] Assignee: Tokyo Shibaura Denki Kabushiki Kaisha, Kawasaki, Japan

[21] Appl. No.: 437,193

[22] Filed: Oct. 28, 1982

[30] Foreign Application Priority Data

Oct. 31, 1981 [JP] Japan ................................ 56-175448

[51] Int. Cl.³ .............................................. H04N 1/46
[52] U.S. Cl. ........................................ 358/75; 358/78; 346/76 PH
[58] Field of Search ................ 358/75, 78; 346/76 PH

[56] References Cited

U.S. PATENT DOCUMENTS

| 4,067,017 | 1/1978 | Dertouzos | 346/76 PH |
| 4,323,919 | 4/1982 | Fujii | 358/75 |
| 4,378,566 | 3/1983 | Tsukamura | 346/76 PH |
| 4,427,985 | 1/1984 | Kikuchi | 346/76 PH |

Primary Examiner—Michael A. Masinick
Attorney, Agent, or Firm—Cushman, Darby & Cushman

[57] ABSTRACT

A color printing apparatus is provided with a document moving mechanism for reciprocatably moving a color document four times, and a scanner for applying successively white, red, green, and blue lights to the color document during each of the forward movements to produce image signals representative of complementary colors of the color lights. A drum with a paper wound therearound rotates forwardly and reversely in synchronism with the reciprocal movement. At the time of the forward movement of the document and the forward rotation of the drum, the thermal head presses a color ink ribbon against the paper to thermally transfer the ink of the color ink ribbon to the paper. At the time of the reverse rotation of the drum, the thermal head is separated from the drum by means of a solenoid.

7 Claims, 16 Drawing Figures

F I G. 1
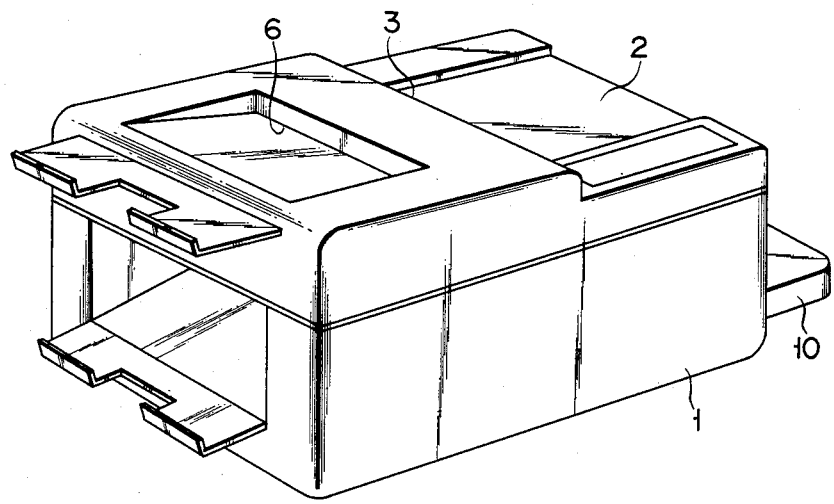
F I G. 3
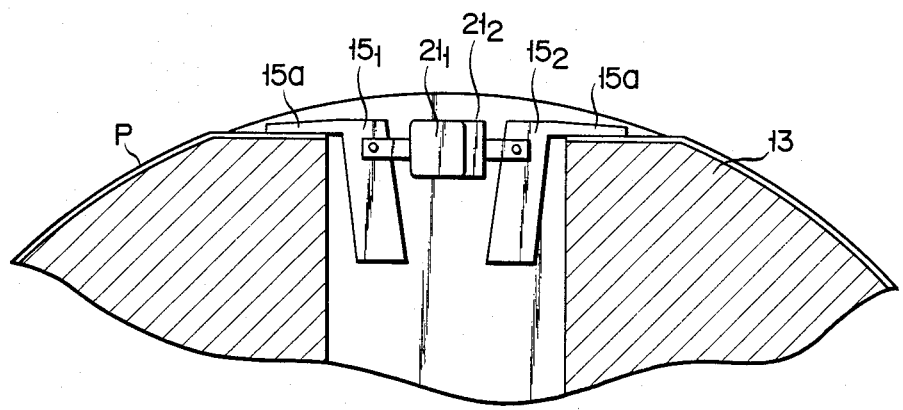

F I G. 12
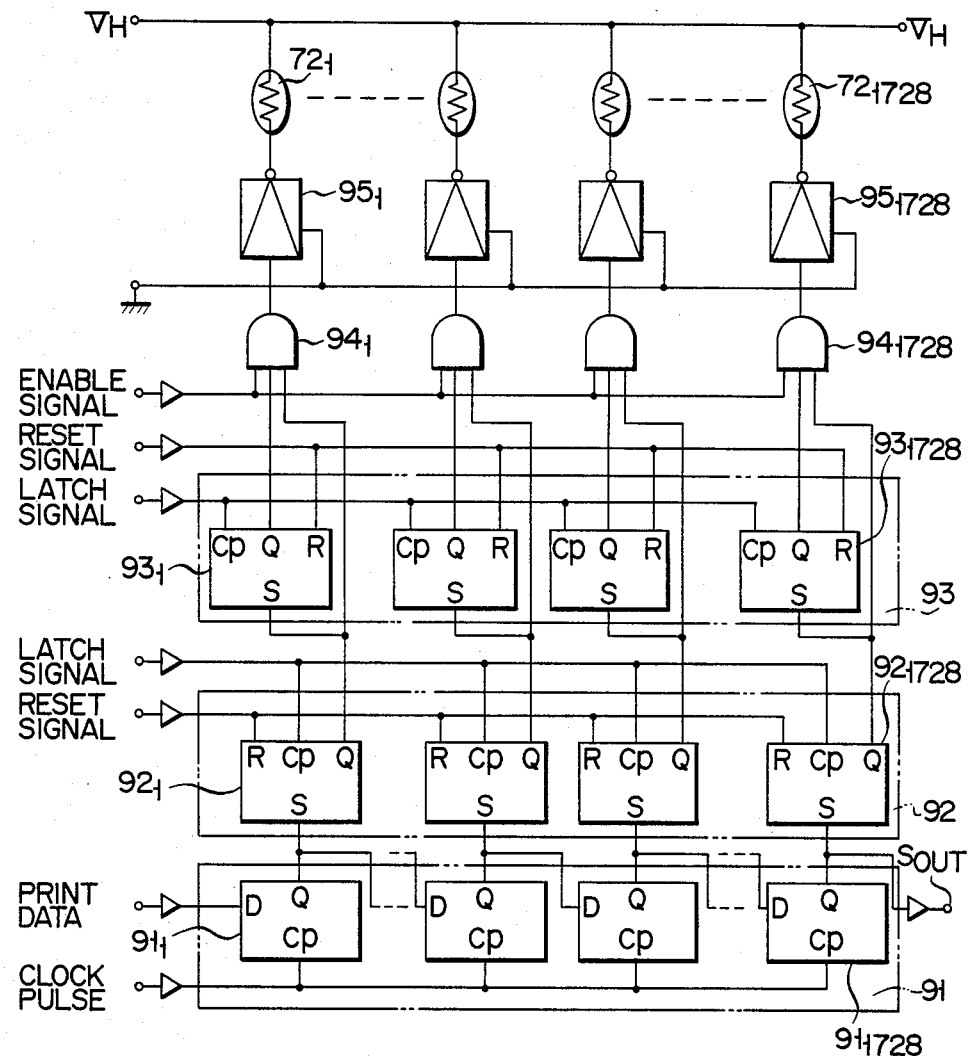

FIG. 14
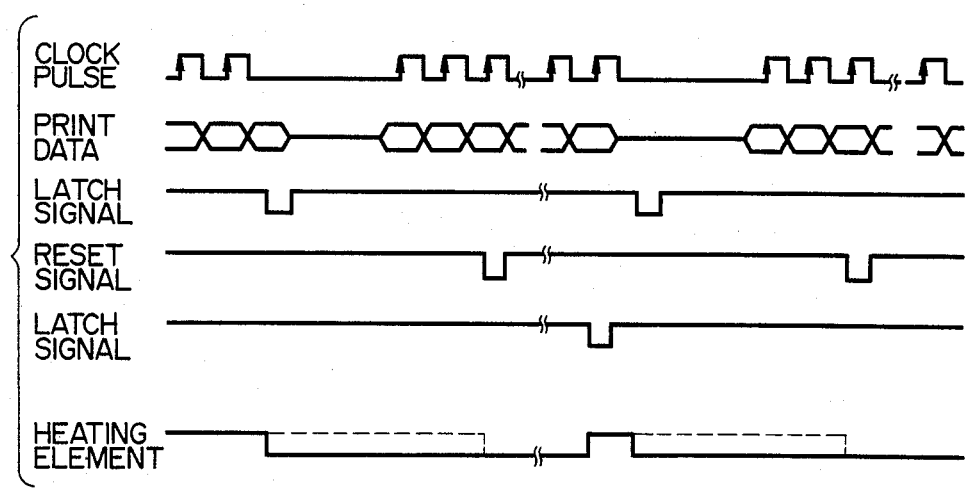
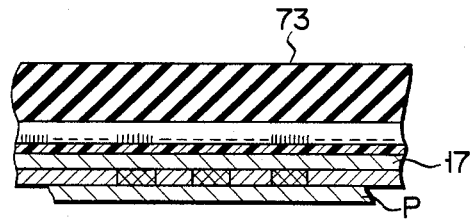
FIG. 15A
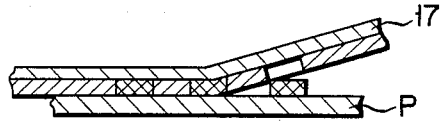
FIG. 15B

COLOR PRINTING APPARATUS

BACKGROUND OF THE INVENTION

The present invention relates to a color printing apparatus and, more particularly, to a color printing apparatus using a thermal head.

There has been known an electrographic color copying apparatus as a color printing apparatus. The color copying apparatus is large in size and expensive to manufacture and to operate, and further, it requires complicated maintenance. Recently, the thermal printing apparatus has attracted much attention because it is low in cost and maintenance-free. Thermal printing apparatuses using thermal heads have been developed and some of them have been put into practical use. The thermal printing apparatus, however, still has technical problems in regard to operating in a color printing mode. So far as we know, there have never been developed thermal color printing apparatuses which are truly practical.

SUMMARY OF THE INVENTION

Accordingly, an object of the present invention is to provide a thermal color printing apparatus of small size, low cost, and high reliability, and which is free from maintenance.

According to the present invention, there is provided a document moving mechanism for reciprocately moving a color document plural times, a paper moving mechanism for reciprocatably moving a paper in synchronism with the reciprocal movement of the document, a scanner for scanning the document during the forward movements to produce image signals respectively representative of different colors corresponding to the forward movements, an ink ribbon moving mechanism for moving an ink ribbon with color ink layers respectively corresponding to the different colors in synchronism with the reciprocal movement, and a thermal head driven by the image signals to thermally transfer to the paper the inks of the ink layers on the ink ribbon.

BRIEF DESCRIPTION OF THE DRAWINGS

FIG. 1 shows a perspective view of an embodiment of a thermal color printing apparatus according to the present invention;

FIG. 3 is a side view of a gripper provided in a paper transfer drum of FIG. 1;

FIG. 12 is a circuit diagram of the thermal head unit of FIG. 9;

FIG. 14 is a graphical presentation illustrating the operation of the thermal head unit of FIG. 9; and FIGS. 15A and 15B illustrate a process of transferring ink from an ink ribbon to a paper sheet by the thermal head unit.

DETAILED DESCRIPTION OF THE PREFERRED EMBODIMENTS

Figure 2:
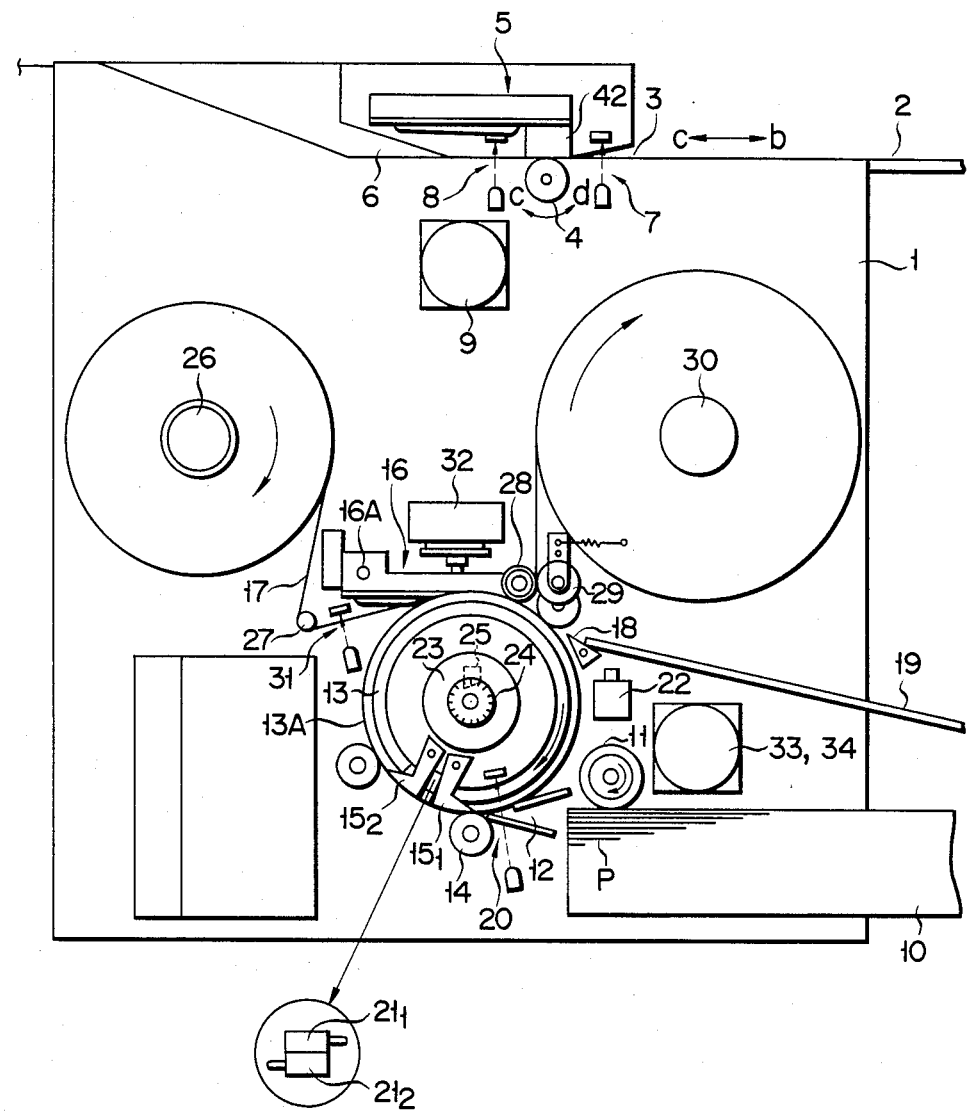
FIG. 2 is a side view of the thermal color printing apparatus of FIG. 1 when a side cover of the apparatus is removed.

Referring to FIG. 1, there is shown a thermal color printing apparatus which is an embodiment of the present invention. In the figure, a body frame 1 of the color printing apparatus is provided with a table 2 on which a document to be printed is placed, and a port 3 through which the document is inserted. As shown in FIG. 2, a scanner 5 is provided adjacent to the document insertion port 3. The document inserted through the port 3 is pressed against a contact sensor head 42 contained in a contact scanner 5 by means of a roller 4. The document passed through the scanner 5 is discharged through a port 6. A detector 7 for detecting the front end of the document is provided in the document insertion port 3. Similarly, a detector 8 for detecting the rear end of the document is provided in the document discharge port 6. The roller 4 is forwardly or reversely rotated by a pulse motor 9.

A cassette 10 containing a stack of papers P is injected into the right lower part of the main frame 1. A paper feed roller 11 feeds papers P sheet by sheet from the cassette 10 along a guide path 12 to a take-up drum 13 with a resilient layer 13A made of rubber, for example, and layered on the surface thereof. The paper sheet P is pressed against the drum 13 by means of a tension roller 14 and fed to a paper gripper $15_1$. As well illustrated in FIG. 3, the paper gripper $15_1$ is provided with a plurality of claws 15a driven by a solenoid $21_1$, which cross the front end of the incoming paper. These claws hold the paper at a plurality of portions when driven by the solenoid $21_1$. A gripper $15_2$ is provided for gripping the rear end of the paper P. A thermal head unit 16, disposed above the drum 13 and coupled with a solenoid 32, is pivoted at the shaft 16A so as to be pulled and separated from the drum 13 by means of the solenoid 32. A color transfer medium 17 such as an ink ribbon 17 wound around a reel 26 is unwound by a roller 27 led to between the drum 13 and the thermal head unit 16, and wound again around by a take-up reel 30 through the combination of a feed roller 28 and a take-up roller 29. The roller 29 presses the ribbon 17 on the roller 28 by means of an arm 29A and a spring 29B. A plurality of claws 18 for peeling the paper P passed through the thermal head unit 16 from the drum 13 are provided in proximity to the surface of the drum 13. Altough not shown, the peeling claws 18, arranged traversing the front end of the paper P, are spaced corresponding to the claws 15a, and driven by solenoids 22. The paper P peeled is then discharged to a tray 19.

A detector 20 constituted by a photoemission element and a photoelectric element, provided on the guide path 12, photoelectrically detects the transferring paper P. The drum 13 is driven by a pulse motor coupled therewith. A timing disk 24 marked with a plurality of slits is mounted to a rotating shaft of the pulse motor 23. The timing detector 25 photoelectrically detects the timing slits of the timing disk 24.

The pulse motor 33 is provided for driving the paper feed roller 11, and the pulse motor 34 is for driving the feed roller 28 and the tension roller 29. The detector 31 comprised of a photoemission element and a photoelectric element, photoelectrically, detects a color of the ink ribbon 17.

Figure 4:
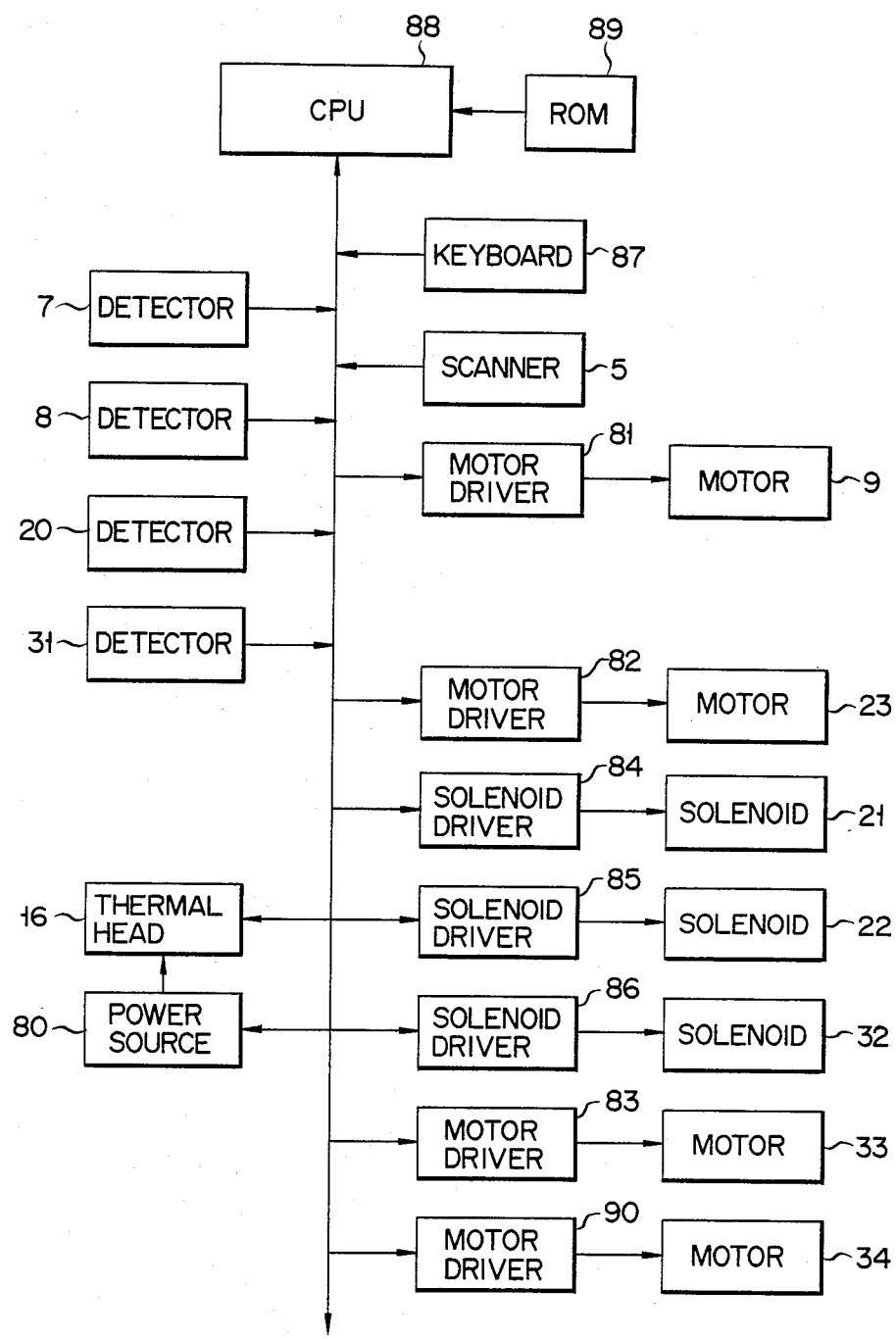
FIG. 4 is a block diagram of a control system in use for the thermal printing apparatus of FIG. 2.
Figure 5:
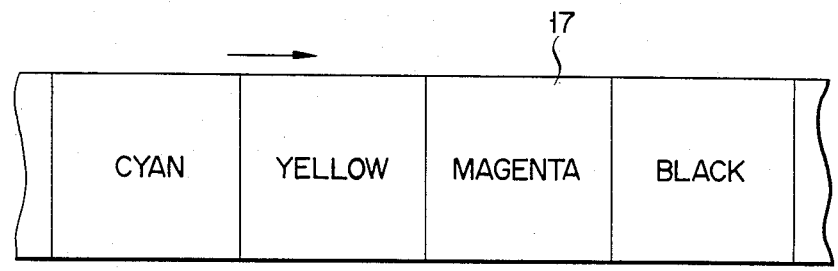
FIG. 5 is a plan view of an ink ribbon used in the printing apparatus of FIG. 2.

Turning now to FIG. 4, there is shown a control system in use for the thermal color printing apparatus according to the present invention. As shown, the scanner 5, the thermal head 16, and the detectors 7, 8, 20 and 31 are coupled together with the CPU 88. The pulse motors 9, 23, 33 and 34 are respectively coupled through the motor drivers 81, 82, 82 and 90 to the CPU 88. The solenoids 21, 22 and 33 are coupled with the CPU 88, through the solenoid drivers 84, 85 and 86, respectively. An operating section, for example, a keyboard unit 87, is provided for starting the print operation or for setting an initial value. A ROM 89 stores a program for executing a sequence of printing operations. The CPU 89 controls the printing operation under control of the program.

The ink ribbon 17 has a plurality of color ink layers formed on a condensor paper of several microns in thickness, as shown. The colors contained in the ink layers are cyan, yellow, magenta, and black, and these colors are arranged on a ribbon base in this order in the moving direction of the ribbon. Each ink layer is made of the combination of wax and pigment or dye.

Figure 6:
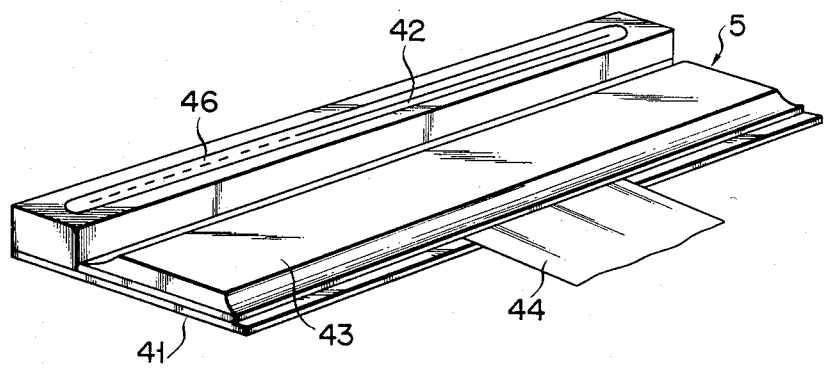
FIG. 6 is a perspective view of a scanner provided in the thermal color printing apparatus of FIG. 2.
Figure 7:
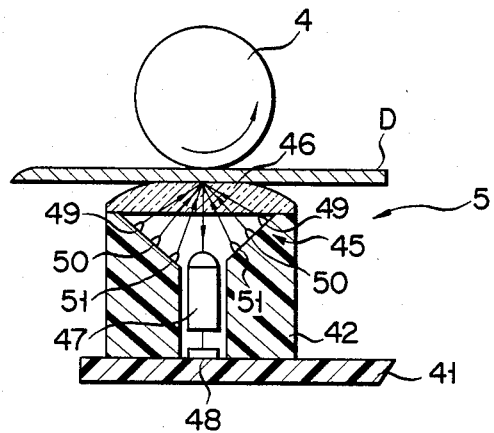
FIG. 7 is a cross sectional view of the scanner of FIG. 6.

As shown in FIG. 6, the scanner 5 is comprised of a line dot sensor 42 with several (e.g. 8) lines per mm and 1728 dots on a ceramic substrate 41, an arcuate protection glass 46 for protecting the line dot sensor 42, a driver controller 43, and a lead wire 44 connected to the driver controller 43. As shown in FIG. 7, the line dot sensor 42 includes LED arrays 49, 50 and 51 for emitting red, green and blue, and a self-focussing (selfoc) lens or rod lens 47 for collecting reflecting light rays, an array of photosensing elements as denoted as 48 for sensing the light rays collected by the lens 47. The line dot sensor 42 confronts the document D through the arcuate protect glass 46. Each of the LED arrays 49, 50 and 51 includes light emitting diodes (LED) corresponding to the number of dots, i.e. 1728. The photosensor array likewise has 1728 photosensing elements. In the line dot sensor 42, when the LED arrays 49, 50 and 51 emit light, the document D is illuminated with the emitted light rays through the protection glass 46. The reflecting light rays from the document D are collected onto the photosensor array 48 by means of the rod lens 47. The photosensor array 48 generates electrical signals corresponding to the reflecting light rays.

Figure 8:
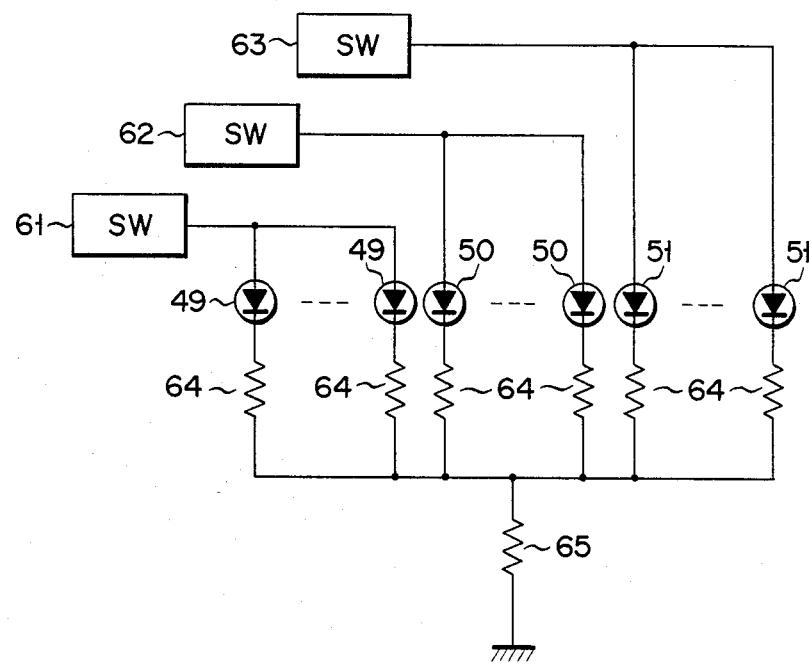
FIG. 8 is a circuit diagram of the scanner of FIG. 6.

In FIG. 8, there is shown an LED array drive circuit. As shown, the LED array 49 for red light emission is comprised of a switch, a group of LEDs 49, and a group of resistors 64 coupled with the LEDs group, and a resistor 65 grounded. The switch 61 is connected to the anodes of the LEDs 49. The resistors 64 connected to the cathodes of the diodes 49 are for adjusting an amount of light of each LED. This circuit arrangement is correspondingly applied for the remaining LED arrays 50 and 51.

Figure 9:
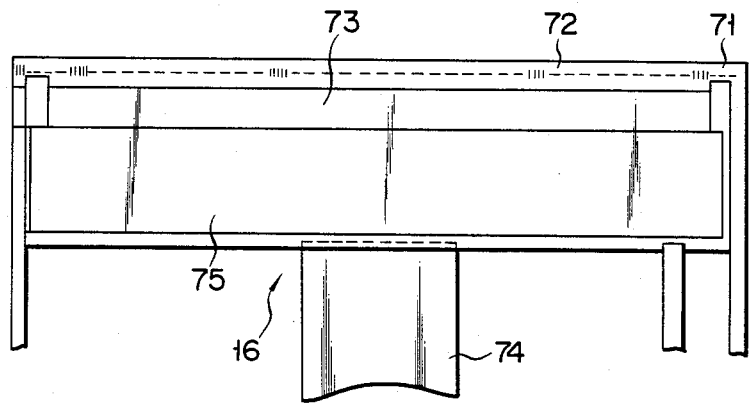
FIG. 9 is a plan view of a thermal head unit provided in the thermal color printing apparatus of FIG. 2.
Figure 10:
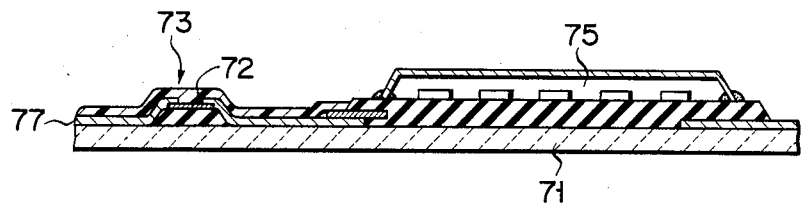
FIG. 10 is a cross sectional view of the thermal head unit of FIG. 9.

As shown in FIGS. 9 and 10, the thermal head unit 16 includes a heating head 73 having 1728 heating elements 72 (equal to the number of the dots) and several tens of lines per mm, which is formed on a substrate 71, and a drive control section 75 for driving the heating head 73.

The drive control section 75 is connected to a lead wire 74 and drives the heating head 73 in response to a signal supplied through the lead wire 74.

Figure 11:
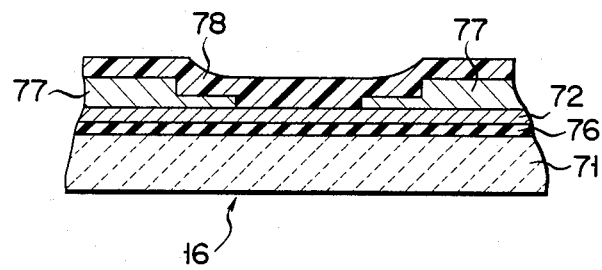
FIG. 11 shows an enlarged view of a heating head of the thermal head unit of FIG. 10.

The heating head 73 includes a graze layer 76 formed on a ceramic substrate 71, and 1728 heating element layers 72 formed on the graze layer 76. A pair of electrode layers 77 are formed separately at a given distance on the heating element layers 72, as shown in FIG. 11. A protect film 78 overlays the heating head 73 for protecting purposes.

FIG. 12 shows a circuit diagram of the thermal head unit 16. A shift register 91 of 1728 bits contained in the thermal head circuit is made up of 1728 D-type flip-flops $91_1$ to $91_{1728}$. Of these flip-flops, a first stage of the flip-flop $91_1$ receives copy data at the terminal D through an inverter. The Q output terminal of the flip-flop $91_1$ is connected to the D terminal of a second stage of the flip-flop $91_2$. Then, the Q output terminal of the second stage of the flip-flop $91_2$ is connected to the D terminal of a third stage of the flip-flop $91_3$. In this way, these flip-flops are changed in successive order. A clock pulse is applied to the Cp terminals of the flip-flops through an inverter. The output terminals of the flip-flops $91_1$ to $91_{1728}$ in the shift register 91, respectively, are connected to the set terminals S of flip-flops $92_1$ to $92_{1728}$ in a latch circuit 92. A rest signal is applied through an inverter to the reset terminal R of the flip-flops $92_1$ to $92_{1728}$. A latch signal is applied through an inverter to the clock terminal Cp of the flip-flops $92_1$ to $92_{1728}$. The output terminals of the flip-flops $92_1$ to $92_{1728}$ are respectively connected to the set terminals of flip-flops $93_1$ to $93_{1728}$ in another latch circuit 93. A latch signal is applied through an inverter to the clock terminals Cp of the flip-flops $93_1$ to $93_{1728}$. A reset signal is supplied to the rest terminals of these flip-flops via an inverter. The output terminals of the flip-flops $93_1$ to $93_{1728}$ are respectively coupled with the second input terminals of AND gates $94_1$ to $94_{1728}$. An enable signal is transferred to the third input terminal of these AND gates, through an inverter. The output terminals of these AND gates $94_1$ to $94_{1728}$ are respectively connected to the input terminals of drivers $95_1$ to $95_{1728}$ with an inverting function. The output terminals of the drivers $95_1$ to $95_{1728}$ are connected through heating elements $72_1$ to $72_{1728}$ respectively to a power source $V_H$.

Figure 13:
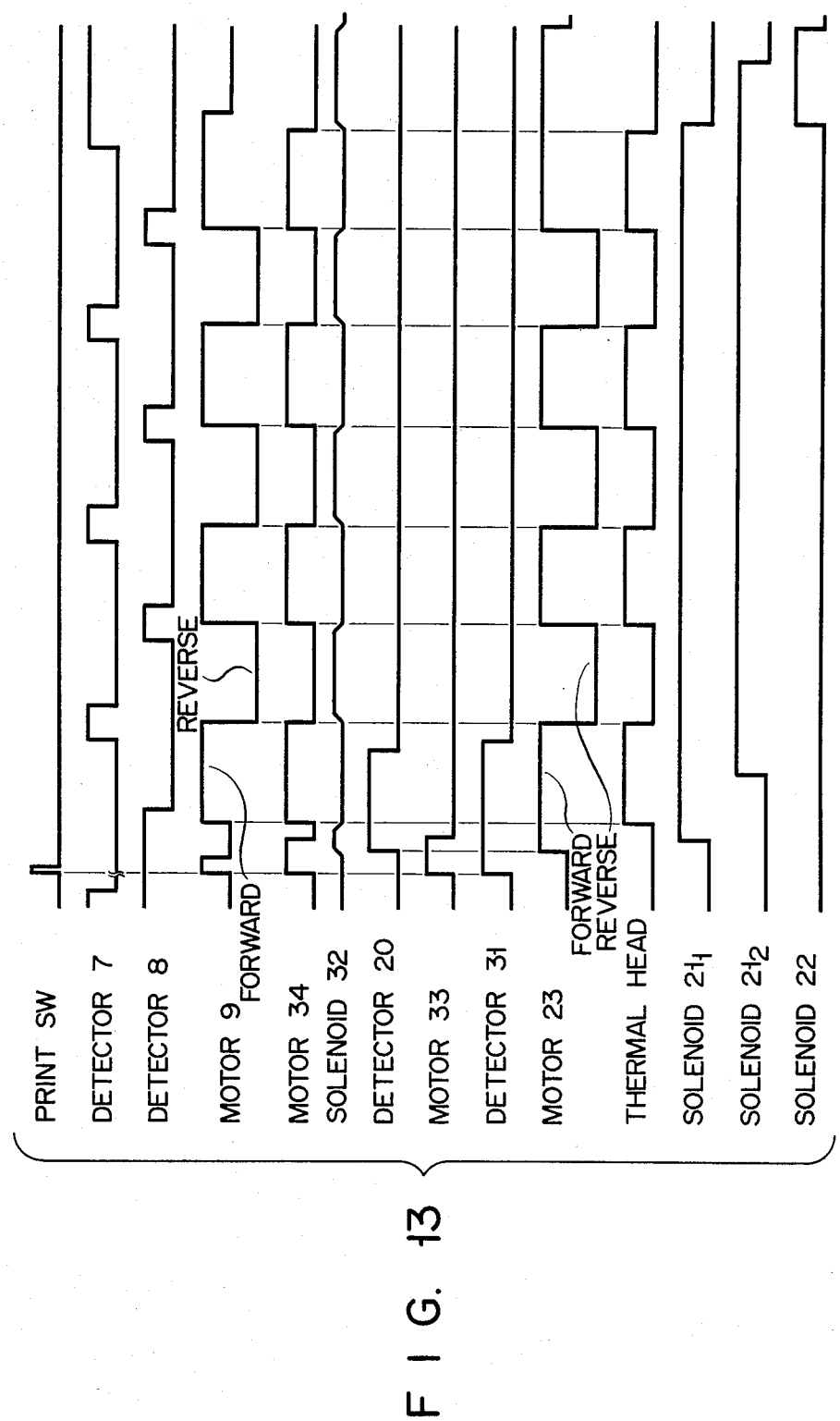
FIG. 13 shows a timing chart useful in explaining the operation of the thermal color printing apparatus of FIG. 2.

The operation of the thermal color printing apparatus thus arranged will be described referring to FIG. 13 illustrating a timing chart.

The document D is placed on the document table 2 and inserted into the document insertion port 3. Under this condition, the copy switch on the keyboard unit 87 is turned on. Upon the turning on of the switch, the CPU 88 gives a drive command to the pulse motor drivers 81, 93 and 90. Then, these motor drivers 81, 83 and 90 drive to rotate the pulse motors 9, 33 and 34, respectively. The forward rotation of the motor 9 rotates the feed roller 4 in the direction of d to feed the document D on the document table 2 to the scanner 5. At this time, the rotation of the motor 33 causes the feed roller 11 to rotate. With the rotation of the feed roller 11, the paper P in the cassette 10 is transferred toward the drum 13. The motor 34 rotates the take-up reel 30. At this time, the detector 31 detects the black of the ink ribbon 17 to produce a detection signal.

When the leading end of the document D reaches the line dot sensor 42 of the scanner 5, the CPU 88 gives a stop command to the pulse motor driver 81. When the paper P is led to the detector 20 through the guide path 12, the CPU 88 gives a drive command to the pulse motor drive 82. When the motor driver 82 rotates the pulse motor 23, the drum 13 rotates. The paper P is transferred to between the drum 13 and the tension roller 14 and is made to intimately contact the resilient layer 13A of the drum 13 by the tension roller 14. And the paper P is transferred with the rotation of the drum 13. At this time, the CPU 88 gives a drive command to the solenoid driver 84 which is in turn energized. The solenoid $21_1$ drives the gripper $15_1$ which then grips the leading end of the paper P with the claw 13a (see FIG. 3).

After a given lapse of time since the leading end of the paper P is detected, the CPU 88 gives a stop command to the motor driver 83 to stop the motor 33 and the roller 11.

When the leading end of the black part of the ink ribbon 17 reaches the heating head 73 of the thermal head unit 16, the CPU 88 gives a stop command to the motor driver 90, thereby stopping the motor 34. At the time that the leading end of the paper P is transferred from the detector 20 to the heating head 73 of the thermal head unit 16, the CPU 88 again rotates the motor 9 in the forward direction through the motor driver 81. With the rotation of the motor 9, the roller 4 again rotates to press the document D against the protection glass 46 of the sensor 42 in the scanner 5 to transfer the document D. At this time, the CPU 88 lights all of the LEDs of the LED arrays 49, 50 and 51 in the scanner 5. The light rays from the LEDs are reflected by the document D and condensed by the photosensor array 48 through the rod lens 47. The photosensor array 48 converts white light of the reflecting light into an electrical signal representing a complementray color of white, i.e. black. The image signal from the scanner 5, i.e. the black image signal, is properly processed by the CPU 88 and is supplied as print data to the thermal head unit 16. At this time, the command of the CPU 88 rotates the pulse motor 34 and rotates the feed roller 28 and the take-up roller 30 to move the ink ribbon 17.

In the thermal head 16, the serial print data, as shown in FIG. 14, is supplied to the shift register 91. The print data is shifted in the shift register 91 in synchronism with the clock pulse. When the print data of 1728 bits corresponding to one line is supplied to the shift register 91, the CPU 88 supplies a latch signal to the latch circuit 92. The latch circuit 92 responds to the latch signal to latch the contents of the shift register 91 therein. At this time, the AND gates $94_1$ to $94_{1728}$ compare the preeceding print data of the latch circuit 93 with the print data. For the present print data, only the AND gates applied with "1" level data are enabled to energize the drivers associated with the enabled AND gates. The drivers 95 feed the heating current to the heating elements 72 associated therewith, respectively. The ink layer 17a of the ink ribbon 17 is pressed against the paper P by the heating head 73 of the thermal head unit 16, as shown in FIG. 15A. When the heating elements 72 are heated, the ink portion of the ink ribbon 17 corresponding to the heating elements 72 is separated from the ink layer and transferred to the paper P, as shown in FIG. 15B. Then, the CPU 88 supplies a reset signal to the latch circuit 93 to reset the latch circuit 93. Then, the latch circuit 93 produces a latch signal which in turn enables the AND gates $94_1$ to $94_{1728}$. As a result, the contents of the latch circuit 92 are supplied to the drivers $95_1$ to $95_{1728}$ through the AND gates $94_1$ to $94_{1728}$, thereby selectively heating the heating elements $72_1$ to $72_{1728}$. As the result of the selective heating of the heating elements $72_1$ to $72_{1728}$, the ink ribbon 17 is transferred to the paper P to effect the dot print. When the CPU 88 supplies the latch signal to the latch circuit 93, the latch circuit 93 latches the contents of the latch circuit 92. Then, every time the CPU 88 supplies the latch signal to the latch circuit 92, the heating elements 72 are heated during a period of time corresponding to the print width according to the present and preceeding print contents. The print signal corresponding to the black color is visualized on the paper P as a print pattern. In a case where the heating elements previously heated must be heated again now, the heating time is shortened to prevent the heating temperature from abnormally rising.

With the advance of the paper P, the rear end of the paper P is caught by the gripper $15_2$. At this time, the solenoid $21_2$ operates to drive the gripper $15_2$ to grip the rear end of the paper P. Under this condition, the paper P is transferred to the thermal head unit 16 with the rotation of the drum 13. At a given time after the rear end of the document D is detected by the detector 7, that is, immediately before the rear end of the document D passes the scanner 5, the CPU 88 reverses the rotation of the pulse motors 9 and 23. At this time, the CPU 88 stops the pulse motor 34 through the motor driver 90, and also energizes the solenoid 32 through the solenoid driver 86. As a result, the travel of the ink ribbon 17 stops. The thermal head unit 16 pressed on the drum 13 by a spring (not shown) is swung upwardly about the shaft 16a by means of the solenoid 32 against the spring and departs from the drum 13. Further, the thermal head unit 16 stops its operation. Under this condition, the document D is returned to its original position in a direction b and the rotation of the take-up drum 13 is reversed.

At a given time after the front end of the document D has been detected by the detector 8, that is, immediately before the front end of the document passes the scanner 5, the CPU 88 forwardly rotates the motors 8 and 23. At this time, the CPU 88 also deenergizes the solenoid 32 and rotates the motor 34. As a result, the document D is transferred in the direction c and the drum B transfers the paper P with the heating head 73 of the thermal head unit 16 pressing the ribbon 17 and the paper sheet P against the take-up drum 13. The switch 62 in the scanner circuit shown in FIG. 8 is closed to energize the LEDs of the LED array 49 for emitting green light. Accordingly, the image signal produced from the scanner 5 becomes an image signal corresponding to magenta as a complementary color of green. According to the magenta image signal, the CPU 88 drives the thermal head unit 16. At this time, the leading end of the magenta portion of the ink ribbon 17 has reached the heating head 73. The ink ribbon 17 is further transported toward the thermal head unit 16, and overlays the paper P printed balck. Accordingly, the magenta is dot-printed on the black printed part on the paper P according to the image signal.

Immediately before the rear end of the document D passes the thermal head 16 after the end of the magenta print, the pulse motors 9 and 23 are reversely rotated and the front end of the paper P is moved to the read and print start position.

When the leading end of the paper P printed with the black and magenta colors reaches the heating head 73, the CPU 88 forwardly rotates the pulse motor 9, and the document D travels in a direction a. At this time, the scanner 5 lights the LEDs 50 of the LED array for blue light emission to scan the document D. Accordingly, the scanner 5 produces an image signal corresponding to the yellow color which is a complementary color of blue. The CPU 88 produces a similar command to print a yellow pattern on the paper P already printed with black and magenta colors.

After the yellow print is completed, cyan as a complementary color of red is dot-printed on the paper P. In this case, the scanner 5 is driven to light the LEDs 49 for red light emission and scans the document D with the red light, and produces an image signal representative of cyan as a complementary color of red. Responsive to the cyan image signal, the CPU drives the thermal head unit 16. As a result, the cyan is dot-printed on the paper P, while superposing the black, magenta and yellow patterns.

After completion of the four colors printing operation, the document is discharged to the document discharge port 6. At this time, the front end of the paper P reaches the claws 18. Also, the CPU 88 issues a solenoid erase command to the driver 84. When the solenoid driver 84 deenergized the solenoid 21, the grippers $15_1$ and $15_2$ having the paper P gripped therewith is released from its gripping state. At this time, the CPU 88 applies a drive command to the solenoid driver 85. When the solenoid driver 85 energizes the solenoid 22, the separation claws 13 intimately contact the drum 13 and separate the paper P from the drum 13, and lead the paper P to the discharge tray 19. When the rear end of the document D is detected the detector 7, CPU 88 stops the pulse motor 9.

As described above, the scanner repreatedly scans the document with different colors, thereby producing color image signals corresponding to the complementary colors of the scanning colors. The thermal head unit is driven according to the color image signals in progressive order. As a result, the color patterns corresponding to the color image signals are successively and superposedly printed on the paper, thereby forming color printed matter.

As described above, the surface of the drum 13 for transporting the paper P of which the front end is gripped is covered with the resilient layer 13A made of rubber. The thermal head 16 and the feed roller 28 are pressed against the resilient surface 13A of the drum 13, while the ink ribbon and the paper P are interposed therebetween. This feature of the present invention ensures a reliable transfer of the paper. Generally, a large resistance of the thermal head 16 impedes the transfer of the paper P. In the present invention, the resilient layer 13A and the gripping of the front end of the paper P cooperate to provide a strong force for carrying the paper. When the paper P is nipped between the roller 28 and the drum 13, the roller and the drum 13 cooperatively transfer the paper P, resulting in a stable transfer of the paper P as a whole.

The resilient layer 13A on the surface of the drum 13 in close contact with the thermal head 16 enhances the contact of the thermal head with the ink ribbon and the paper P, thus preventing these from slipping.

As seen from the foregoing, the present invention successfully provides a thermal color printing apparatus with a stable transfer, a high reliability, and firm contact. The printing apparatus of the present invention is effective particularly for a print where multiple colors are printed many times and the registration of colors is problematic.

What we claim is:

1. A color printing apparatus comprising:
   document moving means for reciprocatably moving a document plural times;
   scanning means for scanning the document during one of the forward and backward movements of the document to produce image signals representative of different colors corresponding to a pattern of the scanned document;
   paper moving means for reciprocatably moving a paper a plurality of times in synchronism with the reciprocal movement of the document;
   thermal head means in close contact with a coloring medium with a repeating pattern of different color ink layers, said thermal head being driven by image signals from said scanning means to press said coloring medium against said paper during movement in one direction and to transfer successively the inks of said ink layer on said coloring medium to said paper; and
   means for separating said thermal head means from said paper during movement in the other direction.

2. A color printing apparatus according to claim 1, wherein said document moving means is a roller rotatable forwardly and reversely to make the document closely contact said scanning means.

3. A color printing apparatus according to claim 1, wherein said paper moving means includes a drum with a resilient layered surface around which said paper is wound, and drive means for driving said drum to rotate forwardly and reversely.

4. A color printing apparatus according to claim 2, wherein said thermal head moving means is solenoid means coupled with thermal head means to pull said thermal head means.

5. A color printing apparatus according to claim 1, wherein said scanning means includes means for emitting successively given different color lights toward said document in successive order, and photosensing means for converting the reflecting lights from the document into said image signals.

6. A color printing apparatus according to claim 5, wherein said light emitting means includes a plurality of arrays each containing a plurality of light emission elements, said arrays being arranged in a width direction of said document, and said photosensor means includes a plurality of arrays each containing a plurality of photosensor elements of which the number is equal to that of said light emitting elements.

7. A color printing apparatus according to claim 1, wherein said thermal head includes a heating section made up of a number of heating elements arranged in a line and made to intimately contact said coloring medium and means for driving said heating elements according to said image signals.

* * * * *